United States Patent [19]
Beaudet et al.

[11] Patent Number: 5,632,498
[45] Date of Patent: May 27, 1997

[54] SNOWMOBILE DOLLY SYSTEM

[76] Inventors: Ernie Beaudet, 6432 Lookout Trail, Stillwater, Minn. 55082; Mark A. Lamberty, 9634 Heath Ave. S., Cottage Grove, Minn. 55016

[21] Appl. No.: 338,043

[22] Filed: Nov. 14, 1994

[51] Int. Cl.⁶ .................................................. B62B 1/06
[52] U.S. Cl. .................................................. 280/79.11
[58] Field of Search .................. 280/79.11, 79.2, 280/79.6, 79.7, 767, 814, 14.1, 47.32, 47.34, 8; 180/182, 183, 184, 185

[56] References Cited

U.S. PATENT DOCUMENTS

| | | | |
|---|---|---|---|
| 3,860,078 | 1/1975 | Stoick | 280/79.11 |
| 3,897,959 | 8/1975 | Haffner | 280/79.11 |
| 4,288,087 | 9/1981 | Morrison | 280/79.11 |

*Primary Examiner*—Richard M. Camby
*Attorney, Agent, or Firm*—Palmatier, Sjoquist, Helget & Voigt, P.A.

[57] ABSTRACT

Disclosed is a three piece snowmobile dolly system that during use is secure in placement under a snowmobile and during nonuse may be compactly nested together. The dolly system is comprised of two forward ski dollies and a rearward track dolly. Each of the forward dollies have a planar base portion with two sidewalls for receiving one of the skis and a V-shaped depression in the planar base for receiving and engaging the wear bar on the bottom of the ski. The rearward dolly has a planar base with four castors for stability. The planar base portions with the sidewalls of the forward ski dollies mesh together and the rearward dolly nests intermediate the castors of either forward ski dolly resulting in a compact package for storage.

12 Claims, 2 Drawing Sheets

SNOWMOBILE DOLLY SYSTEM

BACKGROUND OF THE INVENTION

This invention relates to snowmobiles. More particularly, it relates to a dolly system for facilitating movement of snowmobiles on floor surfaces.

Snowmobiles generally comprise a forward body portion which contains a motor, a rearward seat portion on which the passenger sits and which is positioned on top of a driven track member and two forward skis extending from the forward body portion. Typically, snowmobiling is a seasonal sport and the snowmobile will not be operational and will be in storage, such as in a garage for most of the year. Snowmobiles, although usually quite maneuverable under power in the snow, are quite heavy and cumbersome to move about on hard surfaces such as garage floors. To accommodate such movement, devices to make the snowmobile more mobile on floor surfaces are very useful. Such devices need to be secure and stable under the snowmobile to prevent the snowmobile from tipping or falling off of said devices, creating a risk of damage to the snowmobile or even personal injury. This is especially true where the floor surfaces are rough or there is debris on the floor. Moreover, in that such devices see limited use, they should be so constructed that the may be easily manufactured at minimal expense and, should be compact and easily storable during nonuse.

U.S. Pat. No. 3,881,740 to Bruce A. Johnson et al. describes a pallet with castors on which the snowmobile is placed. This apparatus has a disadvantage that for convenient loading of the snowmobile on the pallet, the machine must be powered or driven onto same. Additionally, the pallet is quite bulky and is collapsible for storage.

U.S. Pat. No. 3,860,078 discloses a three-piece dolly system which has forward dollies for placement under the snowmobile skis and a rearward dolly which engages with a snowmobile support rod at the rear end of the snowmobile. The forward dolly has a trough which receives a longitudinal steering rib on the skis. Contact between the ski dolly and snowmobile ski is limited to the horizontal top surface of the dolly's side rails. The trough is disclosed in the Stoick et al. patent as rectangular in configuration.

U.S. Pat. No. 4,288,087 to Morrison discloses a three-piece dolly system with two forward ski dollies. The ski dollies consist of an axle between two wheels and a crossbar attached to the axle and two longitudinal members affixed to the crossbar to form a H-bar member. Engagement between the ski and the ski dolly is along the longitudinal members on the exterior runner portion of the skis. The rearward dolly comprises a plate with a single castor mounted on the bottom portion of the plate. The ski dollies have a thumb screw to clamp down on the ski to secure the ski to the dolly.

Modern snowmobile skis uniformly have a centrally positioned and longitudinally extending wear bar on the lower surface of the snowmobile skis. Said wear bars are removable and various types and sizes of wear bars are available for specific applications. Many such wear bars have carbide portions which can easily damage even concrete floors.

The applicants are not aware of any prior art which utilizes forward dollies that grip and engage the wide variety of wear bars available and that also provide supplemental sidewall restraints.

SUMMARY OF THE INVENTION

Disclosed is a three piece snowmobile dolly system that during use is secure in placement under a snowmobile and during nonuse may be compactly nested together.

The dolly system is comprised of two forward ski dollies and a rearward track dolly. Each of the forward dollies have a planar base portion with two sidewalls for receiving one of the skis and a V-shaped depression in the planar base for receiving and engaging the wear bar on the bottom of the ski. The rearward dolly has a planar base with four castors for stability. The planar base portions with the sidewalls of the forward ski dollies mesh together and the rearward dolly nests intermediate the castors of either forward ski dolly resulting in a compact package for storage An advantage and feature of the invention is that the crease and v-shaped depression in the planar base portions are sized to center, receive and engage the wear bars found on essentially all newer snowmobiles. The wear bars engage the inwardly facing surfaces and wedge themselves into the V-shaped depression. The engagement provides for a more secure placement of the forward dollies under the snowmobile. Moreover, in a preferred embodiment the material of the base portion is 5052 aluminum alloy which is significantly softer that the hardened steel or carbide of the wear bars allowing the wear bar to bite into inwardly facing surfaces of the V-shaped depression. Thus, a very high friction engagement between the snowmobile ski and the ski dolly is provided.

An advantage and feature of the invention is that the opposing sidewalls on the planar base portions provide guides for a easy initial placement of the forward dollies under the skis. After the initial placement, the forward dollies may be easily adjusted to place the wear bars of the skis in the V-shaped depressions if they are not already so placed.

A further advantage and feature of the invention is that the V-shaped depression also may receive and restrain suspension members in which the ski has been removed. The suspension members have a tapered portion which also wedges into the V-shaped depression.

Moreover, the opposing sidewalls provide restraint for skis in which the wear bar is not in place.

An advantage and feature of the invention is that the four castor rear dolly provides substantially improved stability over the single castor designs. The placement of the four castor dolly under the track is not as critical as in a single castor unit.

An advantage and feature of the invention is that dollies may be easily and relatively inexpensively fabricated from readily available materials and components.

An advantage and feature of the invention is that the dolly system may be compactly stored in a canvas bag when not in use.

DETAILED DESCRIPTION OF THE PREFERRED EMBODIMENTS

Figure 1:
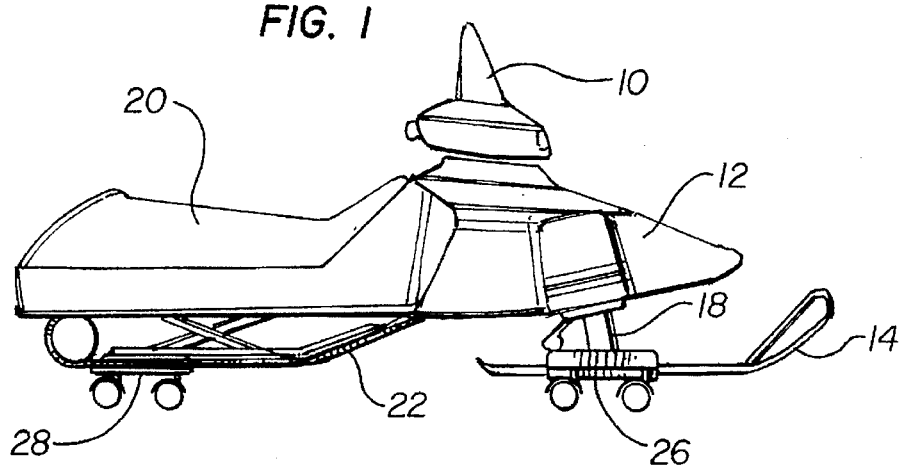
FIG. 1 is a side elevational view of a snowmobile with the dolly system in place.

Referring to FIG. 1, the three-piece dolly system is shown in place under a snowmobile 10. Snowmobiles vary in design, but uniformly are comprised of a forward portion 12 which encloses the engine and from which the skis 14 are supported by way of suspension members 18. Snowmobiles also have a rear seat portion 20 which partially encloses and is on top of a track 22 which is utilized for propelling the vehicle in snow. The dolly system includes two identical forward ski dollies 26, each engaged with a ski, and a single rearward dolly 28 placed under the track.

Figure 2:
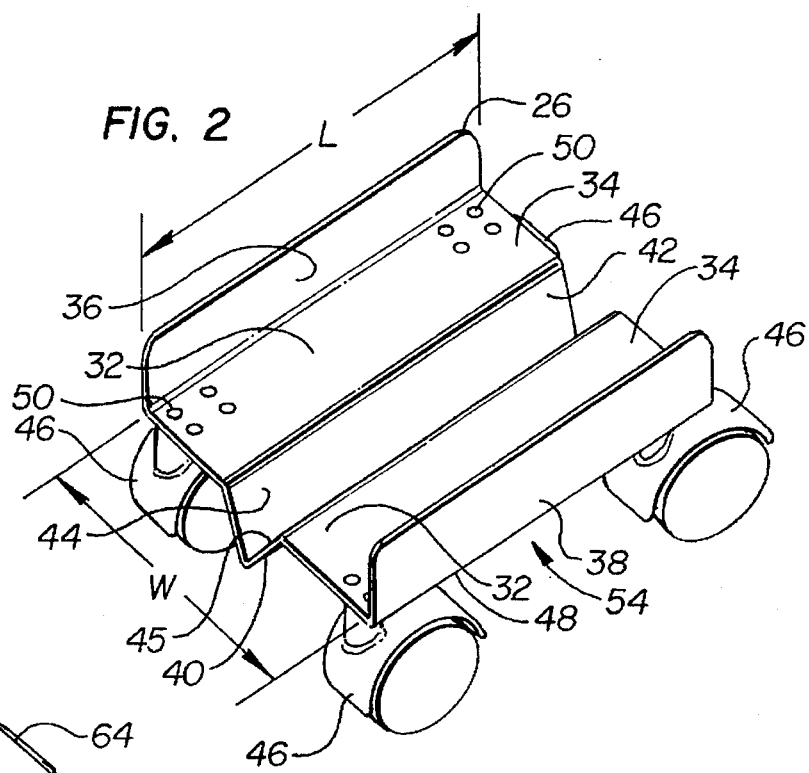
FIG. 2 is a perspective view of a forward ski dolly.

Referring to FIG. 2, one of the forward ski dollies 26 is shown in detail. Each forward dolly 26 has a planar base portion 32 which is shown as substantially rectangular in shape, with a top surface 34. Two sidewalls 36, 38 extend upwardly from the base portion 32. The base portion 32 has a width W between the sidewalls 36, 38 and a length L. A crease 40 forming a V-shaped depression 42 is centrally located and extends lengthwise in the planar base portion 32 and has inside engagement surfaces 44, 45. Four castors 46 are attached to the planar base portion 32 on the bottom surface 48. The castors 46 are attached by way of rivets 50 which are shown on the top surface 54 of the planar base portion 32. The rivets 68 extending above the base portion 32 form part of the top surface 43. The four castors 46 define an intermediate receiving region 54 for the rear track dolly 28.

Figure 3:
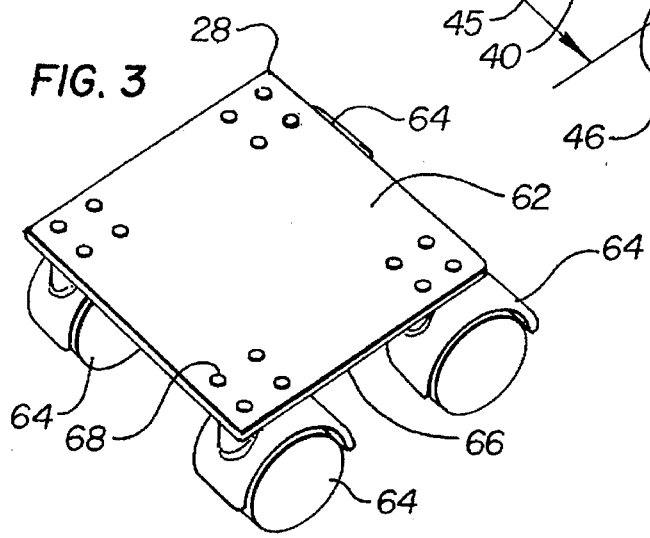
FIG. 3 is a perspective view of a rearward track dolly.

Referring to FIG. 3, the rearward track dolly 28 shown is generally indicated by the numeral 28. The rearward track dolly 28 has a planar base piece 62 with four castors 64 which are attached to the bottom surface 66 of the base plate 62. The castors 64 are attached by way of rivets 68 or other conventional fastening means. As shown in FIG. 1, the rearward track dolly 28 is positioned under the track 22.

In the preferred embodiment, the base portion 32 with the sidewalls and V-shaped depression and the planar base piece 62 may be fabricated by conventional means from 5052 0.125 inch aluminum coil stock. Other suitable materials would include plastics and other metals. The base material may be painted or coated with conventional materials such as elastomeric material.

Figure 4:
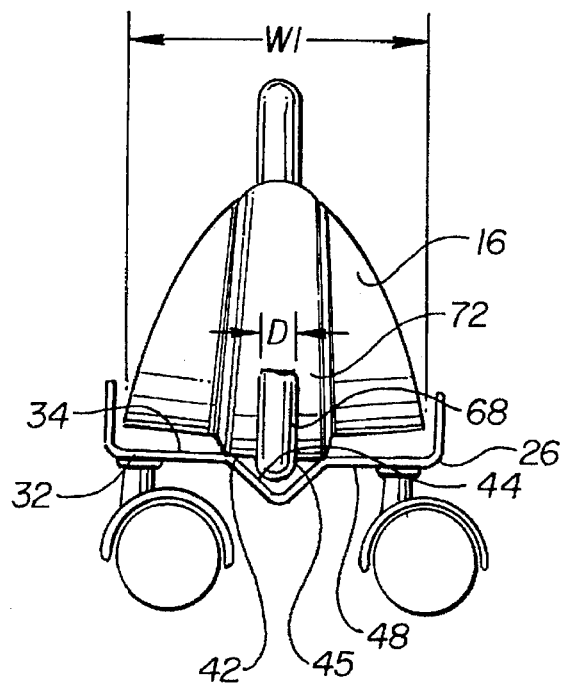
FIG. 4 is a front elevational view of a forward ski dolly in place and engaged with a ski.

Referring to FIG. 4, a front elevational view of a forward ski dolly 26 is shown in place beneath a snowmobile ski 16. The ski has a width W1 which is less than the width W, as shown in FIG. 2, between the side portions. A wear bar 68 extends longitudinally down the bottom surface 72 of the ski 16. The wear bar 68 as shown is generally rod shaped and has a diameter D. Other shapes of wear bars are also utilized, however, all are elongate and taper away from the ski and may be received by the V-shaped depression 42. The crease 40 and V-shaped depression 42 is sized so that the wear bar 68 engages and is gripped in the side surfaces 44, 45 as shown in FIG. 4. Also, the ski 16 is shown in contact with the top surface 34 of the planar base portion 32. Depending on the size of the wear bar 68, the bottom surface 72 of the ski 16 may not contact or rest on the top surface of the base portion 32.

Figure 5:
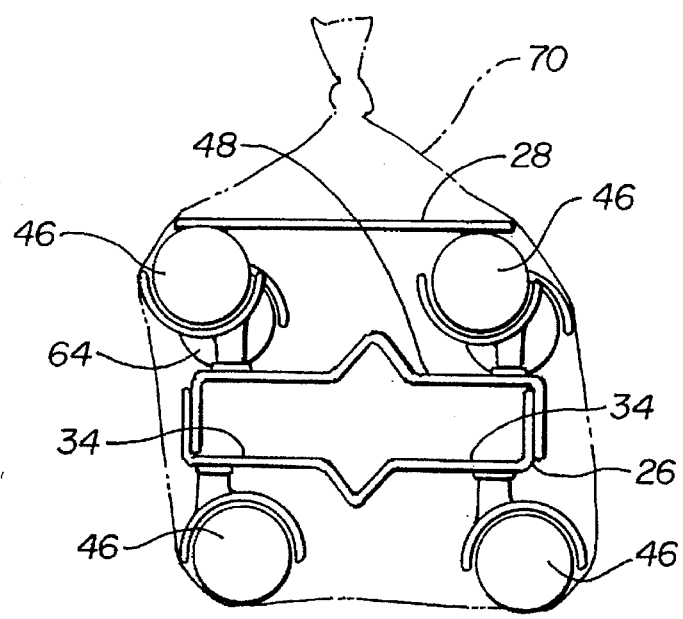
FIG. 5 is a side elevational view of the dolly system nested together and with a bag shown in phantom.

Referring to FIG. 5, the three-piece dolly system is shown in the assembled or nested configuration. The two forward ski dollies 26 engage together top surface 34 to top surface 34. The rear track dolly 28 nests within the receiving region 54 of either of the forward ski dollies 26. The castors 64 of the rear track dolly 28 contact the bottom surface of the adjacent forward ski dolly 26 and, similarly the castors 46 of the forward ski dolly 26 contact the bottom surface 66 of the rear track dolly 28. A bag 70, shown in phantom lines, covers and keeps the dolly system in the assembled or nested arrangement, said bag may be made by conventional means from canvas or similar material.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A dolly system for snowmobiles, the snowmobiles having a rearward track, a pair of forward elongate skis, each ski having a width, a lower ski surface and a wear bar extending lengthwise and centrally positioned on said lower ski surface, the dolly system comprising:
   a) a pair of forward ski dollies for placement under each ski, each ski dolly comprised of a substantially rectangular horizontal base portion having an upper planar surface for contacting the lower ski surface of each ski, a length, a width, and four corners, the upper planar surface having a downwardly extending linear depression extending lengthwise the length of the forward ski dolly, the depression sized for receiving the wear bar, each ski dolly further comprised of a pair of opposing sidewalls adjoining and extending upwardly from the upper planar surface, the opposing sidewalls extending lengthwise on the base portion parallel to the depression, the opposing sidewalls spaced to be greater than the width of the skis whereby the ski may be laterally retained on said upper planar surface by said opposing sidewalls, and four castors, each castor positioned at one of the corners and extending downwardly from the base portion; and
   b) a rearward track dolly comprising a planar base piece with four castors attached to and extending downwardly from the base piece.

2. The dolly system of claim 1, wherein the base portion and sidewalls of the two forward ski dollies are engageable with each other and wherein the four castors of each forward ski dolly define a receiving region and wherein the rearward track dolly is sized for placement in the receiving region of one of the forward ski dollies, whereby the dolly system may be compactly assembled together when not in use.

3. The snowmobile system of claim 2, further comprising a closeable bag made of flexible material, the bag sized for receiving the nested dolly system.

4. The dolly system of claim 1, wherein the base portion is formed of an aluminum alloy.

5. The dolly system of claim 1, wherein the base piece of the rearward track dolly is rectangular with four corners and the four castors are located at the four corners.

6. The dolly system of claim 1, wherein the base portion and the two sidewalls are integral with each other.

7. A ski dolly for snowmobile, the snowmobile having a forward ski with a downwardly facing and longitudinally extending wear bar centrally positioned on the ski, the ski dolly having a substantially rectangular base portion having four corners, oppositely facing upwardly extending side walls, and a downwardly extending V-shaped depression sized for receiving and engaging the wear bar, four castors extending downwardly from the rectangular base, the castors each positioned at one of the four corners of the base portion.

8. A dolly system for snowmobiles, the snowmobiles having a rearward track, a pair of forward elongate skis, each ski having a width, a lower ski surface and a wear bar extending lengthwise and centrally positioned on said lower ski surface, the dolly system comprising:

a) a pair of forward ski dollies for placement under each ski, each ski dolly having a substantially rectangular base portion having four corners, oppositely facing upwardly extending side walls, and a downwardly extending V-shaped depression sized for receiving and engaging the wear bar, each forward ski dolly further comprised of four castors extending downwardly from the rectangular base, the castors each positioned at one of the four corners of the base portion, and b) a rearward track dolly comprising a planar base piece with four castors extending downwardly from the base piece at each of the four corners.

9. The dolly system of claim 8, wherein the base portion and the two sidewalls are integral with each other.

10. The dolly system of claim 8, wherein the base portion is formed of an aluminum alloy.

11. The dolly system of claim 9, wherein the four castors on each forward ski dolly define a receiving region and wherein the rearward track dolly is sized for placement in the receiving region of one of the forward ski dollies, and wherein the base portion and sidewalls of the two forward ski dollies are engageable with each other whereby the dolly system may be compactly assembled together when not in use.

12. The snowmobile system of claim 11, further comprising a closeable bag made of flexible material, the bag sized for receiving the assembled dolly system.

\* \* \* \* \*